United States Patent
Imanaka et al.

(10) Patent No.: US 10,703,332 B2
(45) Date of Patent: Jul. 7, 2020

(54) THREE-POINT SEATBELT DEVICE

(71) Applicant: TOYOTA JIDOSHA KABUSHIKI KAISHA, Toyota-shi, Aichi-ken (JP)

(72) Inventors: Shigekazu Imanaka, Toyota (JP); Makoto Sekizuka, Toyota (JP); Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/048,878

(22) Filed: Jul. 30, 2018

(65) Prior Publication Data
US 2019/0071053 A1 Mar. 7, 2019

(30) Foreign Application Priority Data
Sep. 5, 2017 (JP) .................. 2017-170425

(51) Int. Cl.
*B60R 22/46* (2006.01)
*B60R 22/28* (2006.01)
*B60R 22/22* (2006.01)
*B60R 22/44* (2006.01)

(52) U.S. Cl.
CPC .......... *B60R 22/4676* (2013.01); *B60R 22/22* (2013.01); *B60R 22/28* (2013.01); *B60R 22/44* (2013.01); *B60R 22/46* (2013.01); *B60R 2022/281* (2013.01); *B60R 2022/286* (2013.01); *B60R 2022/289* (2013.01)

(58) Field of Classification Search
CPC ...... B60R 22/4676; B60R 22/22; B60R 22/28
See application file for complete search history.

(56) References Cited

U.S. PATENT DOCUMENTS

| 3,820,815 A | * | 6/1974 | Noir .................. A44B 11/2515 |
| | | | 297/468 |
| 3,942,819 A | * | 3/1976 | Schwanz ............... B60R 22/001 |
| | | | 297/478 |
| 4,674,801 A | | 6/1987 | DiPaola et al. |
| 5,340,152 A | * | 8/1994 | Fohl ........................ B60R 22/28 |
| | | | 280/805 |
| 5,871,235 A | * | 2/1999 | Wier .................... B60R 22/4633 |
| | | | 280/806 |

(Continued)

FOREIGN PATENT DOCUMENTS

| DE | 26 21 983 A1 | 12/1977 |
| GB | 2522335 A | 7/2015 |

(Continued)

*Primary Examiner* — Faye M Fleming
(74) *Attorney, Agent, or Firm* — Oliff PLC (57) ABSTRACT

A three-point seatbelt device includes: a webbing configured to function as a shoulder belt and a lap belt; a shoulder-side reeler that includes a pre-tensioner mechanism and a shoulder-side force limiter mechanism, and is configured to reel up an end portion of the webbing on a shoulder belt side so as to allow the webbing to be pulled out; a tongue mounted on the webbing; and an inner belt including a buckle to which the tongue is coupled, the inner belt including, of a pre-tensioner mechanism and a buckle-side force limiter mechanism, only the buckle-side force limiter mechanism. An initial load of the buckle-side force limiter mechanism is set to be larger than an initial load of the shoulder-side force limiter mechanism.

7 Claims, 6 Drawing Sheets

(56) References Cited

U.S. PATENT DOCUMENTS

| | | | | |
|---|---|---|---|---|
| 6,135,564 | A | * 10/2000 | Wier | B60R 22/28 |
| | | | | 280/805 |
| 8,262,133 | B2 | * 9/2012 | Usoro | B60R 22/4676 |
| | | | | 242/381 |
| 2002/0149191 | A1 | 10/2002 | Nishizawa | |

FOREIGN PATENT DOCUMENTS

| | | |
|---|---|---|
| JP | H11-129864 A | 5/1999 |
| JP | 2002-308045 A | 10/2002 |
| JP | 2013-018460 A | 1/2013 |
| JP | 2016-097869 A | 5/2016 |
| KR | 10-2004-0102100 A | 12/2004 |
| WO | 03/089279 | 10/2003 |

* cited by examiner

AMOUNT OF MOVEMENT OF OCCUPANT
DURING CRASH

FIG. 7

AMOUNT OF MOVEMENT OF OCCUPANT
DURING CRASH

THREE-POINT SEATBELT DEVICE

INCORPORATION BY REFERENCE

The disclosure of Japanese Patent Application No. 2017-170425 filed on Sep. 5, 2017 including the specification, drawings and abstract is incorporated herein by reference in its entirety.

BACKGROUND

1. Technical Field

The present disclosure relates to a three-point seatbelt device.

2. Description of Related Art

In the three-point seatbelt device disclosed in Japanese Patent Application Publication No. 11-129864 (JP 11-129864 A), a shoulder belt-side portion of a webbing is fixed to a vehicle body-side member through a retractor including a pre-tensioner mechanism (hereinafter referred to as a PT mechanism) and a force limiter mechanism (hereinafter referred to as an FL mechanism). An inner belt including a buckle, to which a tongue mounted on the webbing is coupled, also includes a PT mechanism and an FL mechanism.

In the three-point seatbelt device disclosed in Japanese Patent Application Publication No. 2016-97869 (JP 2016-97869 A), a shoulder belt-side portion of a webbing is fixed to a vehicle body-side member through a retractor including a PT mechanism and an FL mechanism. A buckle is fixed to a floor through an energy absorbing plate.

SUMMARY

The inner belt including the PT mechanism of JP 11-129864 A causes an increase in the size of the seatbelt device due to the necessity of securing a pull-in stroke etc. Since the PT mechanism of the retractor and the PT mechanism of the inner belt are in such a relationship that they pull each other upon activation, it is necessary to appropriately control the activation timings of these two PT mechanisms so as not to exert an excessive load on the chest of the occupant. Thus, an ECU etc. that controls the activation timings is required, which adds to the cost.

The technique of JP 2016-97869 A does not take into account the relationship between an activation load of the FL mechanism of the retractor and an activation load of the FL mechanism of the inner belt. Here, a load applied to the inner belt during a crash is a load combining a load from the shoulder belt and a load from the lap belt. In the technique of JP 2016-97869 A, therefore, the FL mechanism of the retractor may fail to be effectively activated while the FL mechanism of the inner belt is activated. In particular, in a form of crash in which the occupant moves obliquely toward the vehicle front side and the outer side in the vehicle width direction, the inner belt is more likely to be subjected to a large load than in a form of crash in which the occupant moves toward the vehicle front side. Accordingly, there is a relatively high likelihood that the FL mechanism of the retractor may fail to be effectively activated while the FL mechanism of the inner belt is activated.

The present disclosure provides a compact and inexpensive three-point seatbelt device that can appropriately reduce a load exerted on the chest of an occupant during a crash.

A three-point seatbelt device according to an aspect of the disclosure includes: a webbing configured to function as a shoulder belt and a lap belt; a shoulder-side reeler that includes a pre-tensioner mechanism and a shoulder-side force limiter mechanism, and is configured to reel up an end portion of the webbing on a shoulder belt side so as to allow the webbing to be pulled out; a tongue mounted on the webbing; and an inner belt including a buckle to which the tongue is coupled, the inner belt including, of a pre-tensioner mechanism and a buckle-side force limiter mechanism, only the buckle-side force limiter mechanism. An initial load of the buckle-side force limiter mechanism is set to be larger than an initial load of the shoulder-side force limiter mechanism.

In this aspect of the three-point seatbelt device, the webbing functions as the shoulder belt and the lap belt as the tongue mounted on the webbing is coupled to the buckle. The shoulder-side reeler is provided at the shoulder belt-side end portion of the webbing. The shoulder-side reeler includes the PT mechanism and the FL mechanism (shoulder-side FL mechanism). Thus, as the PT mechanism is activated during a crash, the webbing is pulled in from the shoulder side, so that any slack in the webbing can be removed. Moreover, as the shoulder-side FL mechanism is activated, an excessive load exerted on the chest of the occupant restrained by the shoulder belt can be reduced.

The inner belt including the buckle also includes the FL mechanism (buckle-side FL mechanism). Thus, as the buckle-side FL mechanism is activated, an excessive load exerted on the waist or the chest of the occupant can be reduced.

Here, including no PT mechanism, the inner belt of the three-point seatbelt device can be manufactured in a compact size. Moreover, electrical control such as ignition to activate the PT mechanism is not required, which can eliminate the need for an ECU etc. to keep costs down.

The initial load of the buckle-side FL mechanism is set to be larger than the initial load of the shoulder-side FL mechanism. This setting allows the shoulder-side FL mechanism to be effectively activated compared with if the initial load of the buckle-side FL mechanism is set to be about equal to or smaller than the initial load of the shoulder-side FL mechanism. As a result, both the shoulder-side FL mechanism and the buckle-side FL mechanism can be effectively activated to appropriately reduce the load exerted on the chest of the occupant. In particular, even during a crash such as an oblique crash in which the occupant moves toward an obliquely front side of the reeler, both the shoulder-side FL mechanism and the buckle-side FL mechanism can be effectively activated to appropriately protect the occupant.

In the above aspect, the initial load of the buckle-side force limiter mechanism may be set to be within a range of 1.3 to 2.2 times the initial load of the shoulder-side force limiter mechanism.

In this configuration, the initial load of the buckle-side FL mechanism is set to be within a range of 1.3 to 2.2 times the initial load of the shoulder-side FL mechanism. With the initial load of the buckle-side FL mechanism thus set to be within an appropriate range with respect to the initial load of the shoulder-side FL mechanism, both the shoulder-side FL mechanism and the buckle-side FL mechanism can be effectively activated.

In the above aspect, a load of the buckle-side force limiter mechanism may be set to become smaller in a latter half of an action of the buckle-side force limiter mechanism than in an early stage of the action.

In this configuration, the load of the buckle-side FL mechanism is set to become smaller in a latter half of an action thereof than in an early stage of the action. Thus, in an early stage of a crash when a load exerted on the shoulder belt starts to increase, the load (initial load) of the buckle-side FL mechanism becomes large, so that the chest of the occupant is securely restrained in the early stage of the crash. Then, in the latter half of the crash when the load exerted by the shoulder belt on the chest of the occupant becomes large as the occupant moves forward, the load of the buckle-side FL mechanism decreases so as to appropriately reduce the load exerted on the chest of the occupant.

In the above aspect, a load of the buckle-side force limiter mechanism may be set to become smaller in a latter half of an action of the buckle-side force limiter mechanism than in an early stage of the action.

In this configuration, the buckle-side FL mechanism is disposed between the buckle and the anchorage position of the inner belt. Thus, the buckle-side FL mechanism is so compact that it can be appropriately applied even to a structure in which a center console is provided on a lateral side of a seat to which the three-point seatbelt device is applied.

In the above aspect, the buckle-side force limiter mechanism may include: a case; a deformable tube disposed inside the case; a wire coupled to the buckle, and extending into the case and passing through the deformable tube; and a squeeze member coupled to the wire at a lower end of the wire. The buckle-side force limiter mechanism may be configured such that, as the buckle is pulled by the tongue, the squeeze member moves upward while deforming the deformable tube and causes the buckle to be pulled out, and a lower part of the deformable tube may have a larger plate thickness than a plate thickness of the remaining part of the deformable tube or has a smaller inside diameter than an inside diameter of the remaining part of the deformable tube.

In this configuration, the buckle-side FL mechanism can have a simple configuration and yet only the initial load thereof can be set to be large.

In the above aspect, the buckle-side force limiter mechanism may include: a deformable plate in which a long hole is formed; a tubular member coupled to the buckle; and a squeeze pin supported at both ends on the tubular member. The long hole may include a fitting part in which the squeeze pin is fitted and a deformable part having a smaller width than the fitting part, the buckle-side force limiter mechanism may be configured such that, as the buckle is pulled by the tongue, the squeeze pin moves in a longitudinal direction of the long hole while deforming the deformable part and causes the buckle to be pulled out, and a width of a portion of the deformable part adjacent to the fitting part may be smaller than a width of the remaining portion of the deformable part, or a plate thickness of the deformable plate at the portion of the deformable part adjacent to the fitting part is larger than a plate thickness of the deformable plate at the remaining portion of the deformable part.

In this configuration, the buckle-side FL mechanism can have a simple configuration and yet only the initial load thereof can be set to be large.

In the above aspect, the buckle-side force limiter mechanism may include: a deformable plate in which a long hole is formed; a tubular member coupled to the buckle; and a squeeze pin supported at both ends on the tubular member. The long hole may include a fitting part in which the squeeze pin is fitted and a deformable part having a smaller width than the fitting part, the buckle-side force limiter mechanism may be configured such that, as the buckle is pulled by the tongue, the squeeze pin moves in a longitudinal direction of the long hole while deforming the deformable part and causes the buckle to be pulled out, and the deformable plate may include a main plate and an additional plate laid on a portion of the main plate such that a plate thickness of the deformable plate at a portion of the deformable part adjacent to the fitting part is larger than a plate thickness of the deformable plate at the remaining portion of the deformable part.

Thus, a simple configuration can be realized in which the initial load of the FL mechanism is set to be large by forming the deformable plate with a partially increased plate thickness.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A three-point seatbelt device S according to a first embodiment will be described below using FIG. 1 to FIG. 6.

The arrows FR, UP, W1, and W2 in the drawings respectively indicate a front side in a seat front-rear direction, an upper side in a seat up-down direction, one side in a seat width direction (buckle side), and the other side in the seat width direction (retractor side). Unless otherwise specified, the words front and rear sides, upper and lower sides, and one and the other sides in the width direction used in the following description respectively mean front and rear sides in the seat front-rear direction, upper and lower sides in the seat up-down direction, and one and the other sides in the seat width direction.

Figure 1:
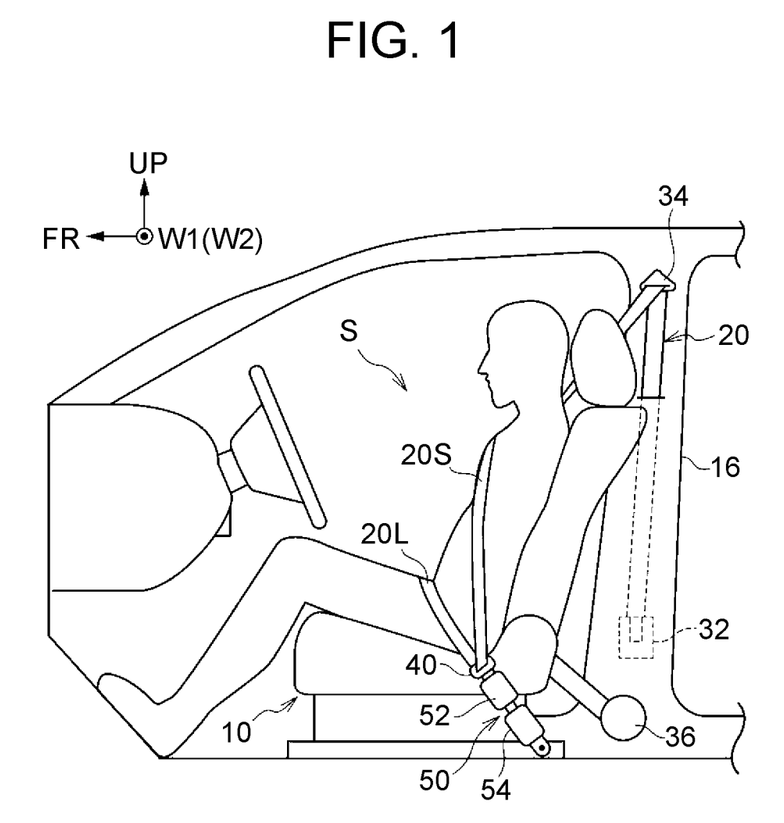
FIG. 1 is a side view of a three-point seatbelt device of a first embodiment as seen from a lateral side of a seat.

As shown in FIG. 1, the three-point seatbelt device S according to this embodiment is applied to a vehicle seat 10 that is a right-side seat in a first row (the driver's seat in a right-hand drive vehicle). Thus, in this embodiment, a vehicle front side, a vehicle upper side, an inner side in a vehicle width direction, and an outer side in the vehicle width direction respectively coincide with the seat front side, the seat upper side, the one side in the seat width direction, and the other side in the seat width direction.

Basic Configuration of Three-Point Seatbelt Device

The three-point seatbelt device S includes a webbing 20 that restrains an occupant. The webbing 20 is made of a material such as chemical fiber and formed as a flexible elongated belt. An end portion of the webbing 20 on one side in a longitudinal direction thereof (on the side of a shoulder belt 20S) is engaged on a spool (not shown) of a retractor 32 serving as a "shoulder-side reeler" provided at a lower end of a B-pillar 16. An intermediate portion of the webbing 20 in the longitudinal direction is passed through a shoulder anchor 34 (a slip guide or a slip joint), provided at an upper part of the B-pillar 16, so as to be folded back. An end portion of the webbing 20 on the other side in the longitudinal direction thereof (on the side of a lap belt 20L) is engaged on an anchor member 36 fixed at the lower end of the B-pillar 16.

A tongue 40 is mounted on a portion of the webbing 20 between the shoulder anchor 34 and the anchor member 36 so as to be movable in the longitudinal direction of the webbing 20.

An inner belt 50 is provided on one side of the vehicle seat 10 in the seat width direction (the inner side in the vehicle width direction). The inner belt 50 includes a buckle 52. When the tongue 40 is coupled to the buckle 52, the occupant seated in the vehicle seat 10 is fastened with the seatbelt (this state will be hereinafter referred to as a fastened state). In the fastened state, a portion of the webbing 20 between the tongue 40 and the shoulder anchor 34 functions as the shoulder belt 20S that restrains the chest and the shoulder of the occupant, while a portion of the webbing 20 between the tongue 40 and the anchor member 36 functions as the lap belt 20L that restrains the waist of the occupant.

Retractor with PT Mechanism and FL Mechanism

The retractor 32 is a reeler that reels up the webbing 20 on the spool and houses the webbing 20 so as to allow the webbing 20 to be pulled out. The retractor 32 has a locking mechanism that locks the spool so as not to rotate and restricts pulling out of the webbing 20, when it is detected that an acceleration rate of the vehicle is not lower than a predetermined value or that a pull-out acceleration rate of the webbing 20 is not lower than a predetermined value.

The retractor 32 has a PT mechanism (not shown). The PT mechanism may be a publicly known one, and for example, is of a pyrotechnic type. When a frontal crash is detected, an explosive is ignited, which causes the spool to rotate and forcibly reel up the webbing 20. The retractor 32 further has a pre-crash seatbelt mechanism. When a frontal crash or a lateral crash is predicted, the pre-crash seatbelt mechanism rotates the spool by the driving force of a motor to forcibly reel up the webbing 20.

The retractor 32 further has an FL mechanism (not shown; hereinafter referred to as a shoulder-side FL mechanism). The shoulder-side FL mechanism may be a publicly known one. In this embodiment, for example, the initial load of the shoulder-side FL mechanism is set to about 4 kN. The initial load of the FL mechanism means a load (a load in a direction in which the webbing is pulled out) required for the FL mechanism to start an action from an inactive state.

Inner Belt

Figures 2A, 2B:
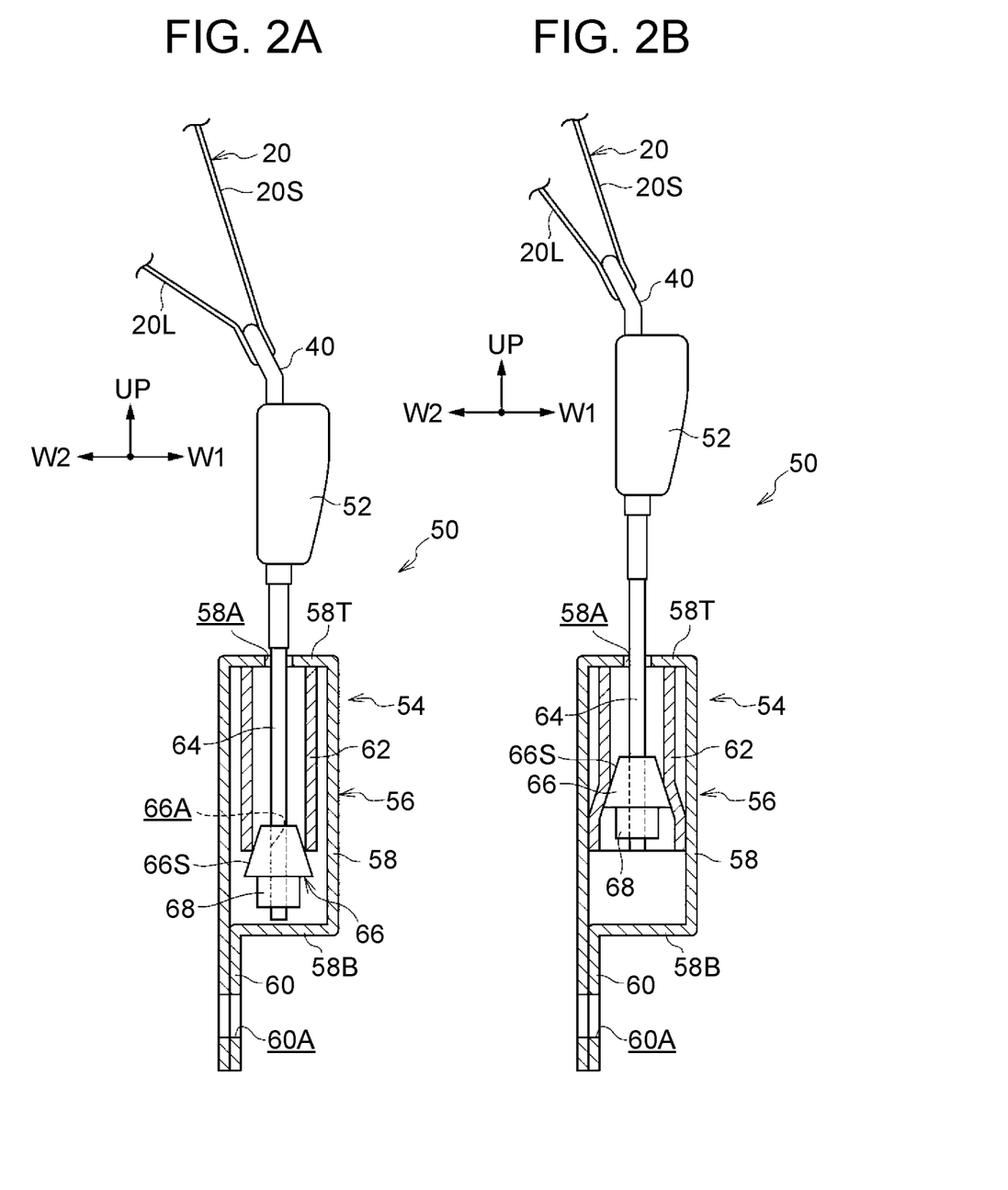
FIG. 2A is a partially sectional view showing an inner belt in a state where an FL mechanism of the first embodiment is not in action.
FIG. 2B is a partially sectional view showing the inner belt in a state where the FL mechanism of the first embodiment is in action.

FIG. 2A shows the inner belt 50 with a longitudinal direction thereof oriented in the up-down direction. The inner belt 50 is coupled to the tongue 40 at the buckle 52 on one side in the longitudinal direction (upper side), and is rotatably coupled to a vehicle body-side member such as a vehicle body or the vehicle seat 10 on the other end side (lower side). The inner belt 50 includes an FL mechanism 54 as a "buckle-side FL mechanism." As can be understood from the other part of the description of this embodiment, in this specification, a member that includes the buckle and is coupled to a vehicle body-side member is referred to as an inner belt. Therefore, a member that does not include an elongated belt-shaped member like a webbing as in this embodiment also corresponds to the inner belt.

The FL mechanism 54 includes a case 56. The case 56 includes a housing part 58 in which a deformable tube 62 and a squeeze member 66 to be described later are disposed, and an anchor 60 coupled to the vehicle body-side member. The anchor 60 has a shaft insertion hole 60A. The inner belt 50 is rotatably coupled to the vehicle body-side member by using the shaft insertion hole 60A.

The housing part 58 is formed integrally with the anchor 60. The housing part 58 is formed so as to protrude toward the one side in the seat width direction (the inner side in the vehicle width direction) relative to the flat plate-shaped anchor 60. In other words, the housing part 58 is located on the outer side in the seat width direction relative to an imaginary plane defined by the plate-shaped anchor 60. The housing part 58 has a substantially rectangular parallelepiped shape.

The FL mechanism 54 includes the deformable tube 62. The deformable tube 62 is provided inside the case 56. The deformable tube 62 extends in the longitudinal direction of the inner belt 50 and has a tube shape with a quadrangular cross-section, and is formed so as to have a constant plate thickness from an upper end to a lower end. The upper end of the deformable tube 62 is joined to an upper wall 58T of the case 56, and the lower end of the deformable tube 62 is disposed with a clearance to a lower wall 58B of the case 56.

The FL mechanism 54 includes a wire 64 coupled to the buckle 52. One end (upper end) of the wire 64 is coupled to the buckle 52, while the other end is inserted into the case 56 through a through-hole 58A formed in the upper wall 58T of the case 56. The through-hole 58A of the upper wall 58T communicates with an inside of the deformable tube 62, and the wire 64 passes through the inside of the deformable tube 62. The squeeze member 66 is mounted at the other end (lower end) of the wire 64.

Specifically, the squeeze member 66 has an insertion hole 66A for the wire 64 to pass through. The wire 64 is passed through the insertion hole 66A of the squeeze member 66, and an engaging member 68 is fixed at the other end (lower end) of the wire 64. Thus, the squeeze member 66 is prevented from coming off from the other end side of the wire 64.

The insertion hole 66A of the squeeze member 66 extends through the squeeze member 66 in the up-down direction. The cross-section of the squeeze member 66 orthogonal to the up-down direction has a quadrangular shape similar to the cross-sectional shape of the deformable tube 62. The squeeze member 66 is shaped so as to expand gradually from an upper end toward a lower end. Thus, a side surface 66S of the squeeze member 66 is a flat surface inclined in a direction away from a central axis of the squeeze member (in this embodiment, from a portion thereof where the wire 64 is passed) while extending from the upper end toward the lower end of the squeeze member 66.

A portion of the squeeze member 66 on the upper side is disposed inside the deformable tube 62. On the other hand, a portion of the squeeze member 66 on the lower side is disposed outside the deformable tube 62 (on the lower side of the deformable tube 62). The side surface 66S of the squeeze member 66 is in contact with the lower end of the deformable tube 62. Specifically, the entire circumference of the deformable tube 62 at the lower end is in contact with the inclined side surface 66S of the squeeze member 66.

Description of Action of FL Mechanism

Next, an action of the FL mechanism 54 will be described.

For example, when a form of crash such as a frontal crash in which the occupant moves toward the seat front side occurs, the buckle 52 is subjected to a large load acting in the direction of separating the buckle 52 from the case 56. This load is transmitted to the squeeze member 66 through the wire 64 coupled to the buckle 52, causing the squeeze member 66 to move upward while deforming the deformable tube 62 (FIG. 2B). Thus, energy is absorbed by deformation of the deformable tube 62, and the buckle 52 is pulled out upward.

Specifically, the deformable tube 62 deforms along the inclined side surface 66S of the squeeze member 66. As the squeeze member 66 comes in contact with the upper wall 58T of the case 56, the amount of the buckle 52 pulled out is limited. The dimension of the cross-section of the squeeze member 66 at the lower end is set such that the deformed deformable tube 62 comes in contact with or closer to the case 56 from the inner side.

Figure 6:
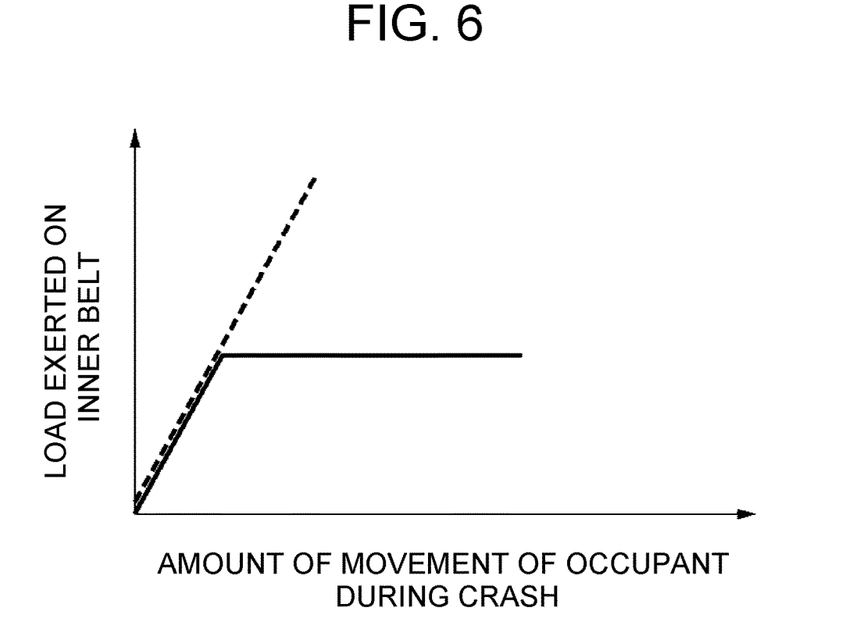
FIG. 6 is a graph showing the load characteristics of the FL mechanism.

The load characteristics of the FL mechanism 54, i.e., the relationship between the amount of movement of the occupant during a crash and a load exerted on the inner belt 50 (the load on the inner belt) is represented by the solid line in FIG. 6. The dashed line in FIG. 6 represents the relationship in a case where the inner belt 50 does not include an FL mechanism.

As shown in FIG. 6, the load exerted on the inner belt in an early stage of a crash increases as the amount of movement of the occupant increases. However, after hitting an upper limit, for example, about 5.5 kN, the load on the inner belt does not increase further and remains substantially constant even when the amount of movement of the occupant increases. A time point at which the load on the inner belt reaches about 5.5 kN is a time point at which the FL mechanism 54 starts an action. Thus, in the FL mechanism 54 of this embodiment, when a load acting in the direction of pulling out the buckle 52 (the upward direction in FIG. 2A and FIG. 2B) reaches about 5.5 kN, the deformable tube 62 starts to be deformed by the squeeze member 66. Thereafter, the buckle 52 is pulled out while the load remains substantially constant (at about 5.5 kN).

Operational Effects

Next, operational effects of this embodiment will be described.

The three-point seatbelt device S of this embodiment is a three-point seatbelt device in which the webbing 20 functions as the shoulder belt 20S and the lap belt 20L as the tongue 40 mounted on the webbing 20 is coupled to the buckle 52. The retractor 32 is provided at the end portion of the webbing 20 on the side of the shoulder belt 20S. The retractor 32 includes the PT mechanism and the FL mechanism (shoulder-side FL mechanism). Thus, as the PT mechanism is activated during a crash, the webbing 20 is pulled in and any slack in the webbing 20 can be removed. Moreover, as the shoulder-side FL mechanism is activated, an excessive load exerted on the chest of the occupant restrained by the shoulder belt 20S can be reduced. The inner belt 50 including the buckle 52 also includes the FL mechanism 54 (buckle-side FL mechanism). Thus, as the buckle-side FL mechanism 54 is activated, an excessive load exerted on the waist or the chest of the occupant can be reduced.

Here, including no PT mechanism, the inner belt 50 of the three-point seatbelt device S can be manufactured in a compact size. Moreover, electrical control such as ignition to activate the PT mechanism is not required, which can eliminate the need for an ECU etc. to keep costs down.

The initial load of the buckle-side FL mechanism 54 is set to be larger than the initial load of the shoulder-side FL mechanism. This setting allows the shoulder-side FL mechanism to be effectively activated compared with if the initial load of the buckle-side FL mechanism is set to be about equal to or smaller than the initial load of the shoulder-side FL mechanism. As a result, both the shoulder-side FL mechanism and the buckle-side FL mechanism 54 can be effectively activated to appropriately reduce the load exerted on the chest of the occupant. In particular, even during a crash such as an oblique crash in which the occupant moves toward an obliquely front side of the reeler (in this embodiment, provided on the outer side in the vehicle width direction), both the shoulder-side FL mechanism and the buckle-side FL mechanism 54 can be effectively activated to appropriately protect the occupant.

The initial load of the buckle-side FL mechanism is set to be within a range of preferably 1.3 to 2.2 times, and more preferably 1.5 to 2.0 times, the initial load of the shoulder-side FL mechanism. With the initial load of the buckle-side FL mechanism 54 thus set to be within an appropriate range with respect to the initial load of the shoulder-side FL mechanism, both the shoulder-side FL mechanism and the buckle-side FL mechanism 54 can be effectively activated.

In this embodiment, the buckle-side FL mechanism 54 is disposed between the buckle 52 and the anchorage position of the inner belt 50 (the shaft insertion hole 60A of the anchor 60). Thus, the buckle-side FL mechanism 54 is so compact that it can be appropriately applied even to a structure in which a center console is provided on a lateral side of the seat (vehicle seat 10) to which the three-point seatbelt device S is applied.

Second Embodiment

Next, a three-point seatbelt device according to a second embodiment will be described. In the second embodiment, the configuration of an inner belt 150 is different from the configuration of the inner belt 50 of the first embodiment.

Figure 4A:
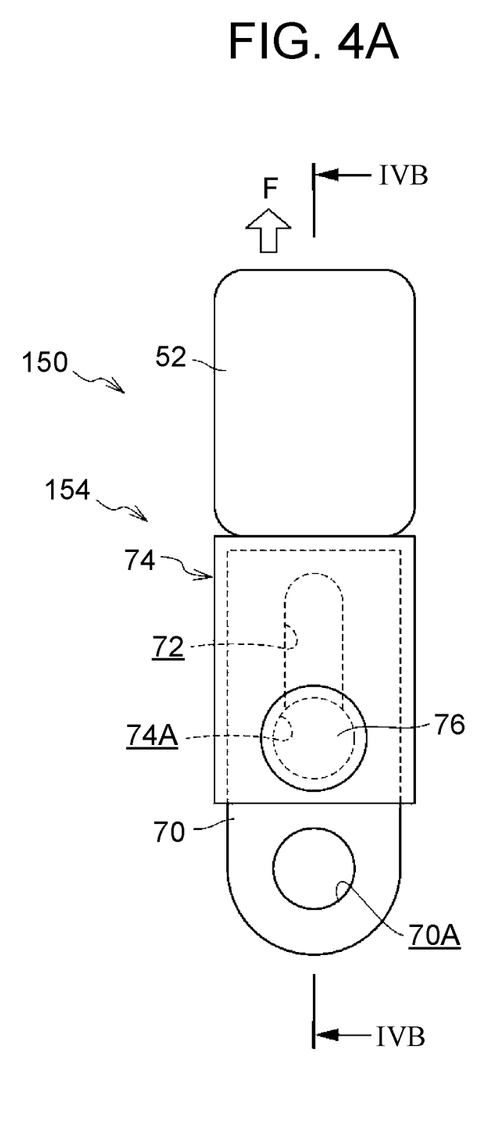
FIG. 4A is a side view of an inner belt of a second embodiment as seen from the lateral side of the seat.
Figure 4B:
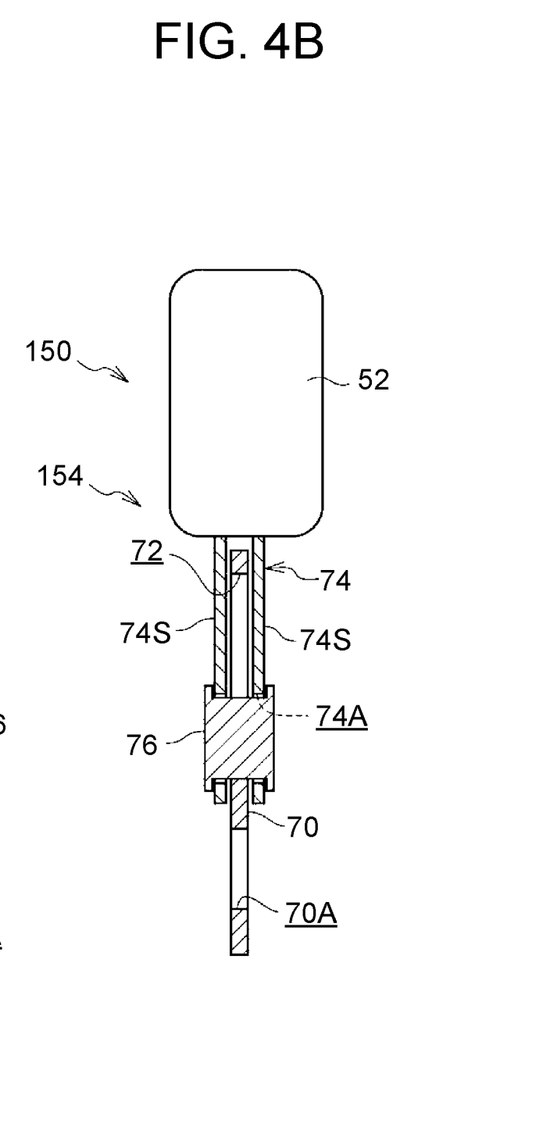
FIG. 4B is a sectional view taken along line IVB-IVB in FIG. 4A.

FIG. 4A and FIG. 4B show the inner belt 150 of the second embodiment. An FL mechanism 154 of the inner belt 150 of the second embodiment includes an anchor bracket 70 as a "deformable plate." The anchor bracket 70 is made of metal and has a plate shape. A shaft insertion hole 70A is formed at a lower end of the anchor bracket 70. A shaft (not shown) is passed through the shaft insertion hole 70A, and the anchor bracket 70 is coupled to a vehicle body-side member so as to be rotatable around the shaft extending substantially in the seat width direction.

A long hole 72 in which a squeeze pin 76 to be described later is fitted and of which a longitudinal direction is oriented in the up-down direction is formed in a region of the anchor bracket 70 above the shaft insertion hole 70A. The specific configuration of the long hole 72 will be described later.

The FL mechanism 154 includes a buckle bracket 74 as a "tubular member" that is coupled to the buckle 52. The buckle bracket 74 has a tubular shape with a rectangular cross-section. A portion of the anchor bracket 70 is disposed inside the buckle bracket 74.

A pin support hole 74A is formed in the buckle bracket 74. The pin support hole 74A extends through a pair of opposite side walls 74S of the buckle bracket 74. The squeeze pin 76 is passed through the pin support hole 74A, and both side portions of the squeeze pin 76 in an axial direction thereof are respectively supported on the side walls 74S of the buckle bracket 74. An intermediate portion of the squeeze pin 76 in the axial direction is fitted in a portion of the long hole 72 of the anchor bracket 70.

Figure 5A:
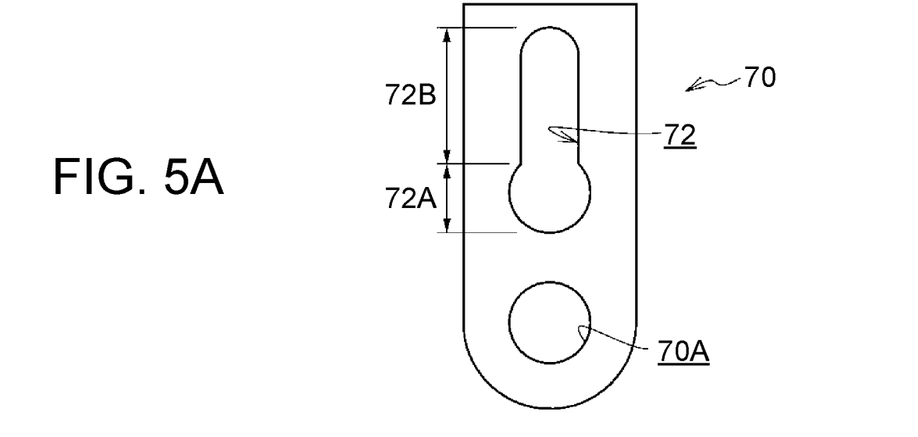
FIG. 5A is a view showing an anchor bracket of the inner belt of the second embodiment.

FIG. 5A shows the anchor bracket 70 as a single component. The long hole 72 includes a fitting part 72A in which the squeeze pin 76 is fitted, and a deformable part 72B. The fitting part 72A is formed in a size corresponding to the size of the intermediate portion of the squeeze pin 76 in the axial direction. On the other hand, the deformable part 72B is formed so as to have a width dimension (in the right-left direction in FIG. 5A) smaller than the diameter of the intermediate portion of the squeeze pin 76 in the axial direction. Thus, the squeeze pin 76 is normally fitted in the fitting part 72A of the long hole 72 so as not to move.

Description of Action of FL Mechanism

Next, an action of the FL mechanism 154 will be described.

For example, when a form of crash such as a frontal crash in which the occupant moves toward the seat front side occurs, first, the PT mechanism of the retractor 32 is activated, so that the webbing 20 is pulled in from the shoulder side and any slack in the webbing 20 is removed. Next, as the occupant tries to move toward the seat front side by inertia, a high tension is applied to the shoulder belt 20S and the lap belt 20L restraining this occupant. Then, the buckle 52 is subjected to a load combining a load from the shoulder belt 20S and a load from the lap belt 20L, i.e., a large load acting in the direction of separating the buckle 52 from the anchor bracket 70 (see the arrow F in FIG. 4A). This load is transmitted to the squeeze pin 76 through the buckle bracket 74 coupled to the buckle 52, causing the squeeze pin 76 to move upward while deforming the deformable part 72B of the long hole 72. Thus, energy is absorbed by deformation of the long hole 72 (anchor bracket 70), and the buckle 52 is pulled out upward. The FL mechanism 154 can also realize the load characteristics shown in FIG. 6.

Modified Example of Load Characteristics of FL Mechanism 54

Figure 7:
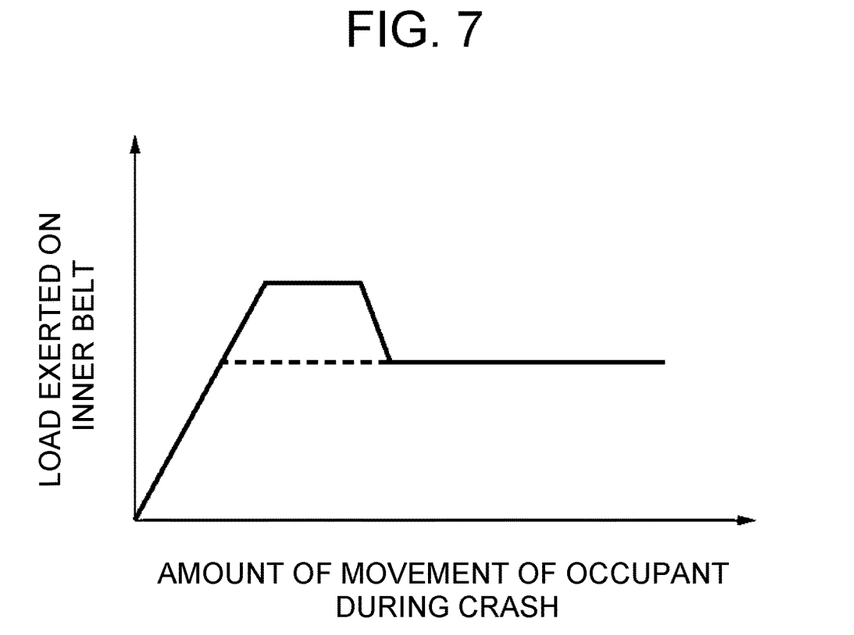
FIG. 7 is a graph showing a modified example of the load characteristics of the FL mechanism.

The load characteristics of the FL mechanism (the relationship between the amount of movement of the occupant and the load exerted on the inner belt during a crash) may be changed to the load characteristics as shown in FIG. 7.

As shown in FIG. 7, in the modified example of the load characteristics, the load exerted on the inner belt increases as the amount of movement of the occupant increases in an early stage of a crash. At a time point when the load exerted on the inner belt reaches about 7 kN, for example, the load exerted on the inner belt stops increasing. The time point at which the load exerted on the inner belt reaches about 7 kN is a time point at which the FL mechanism 54 starts an action. When the amount of forward movement of the occupant further increases, the load exerted on the inner belt decreases to about 5.5 kN, for example. Thereafter, the load remains at about 5.5 kN even when the amount of movement of the occupant increases.

As has been described above, in the modified example of the load characteristics, the initial load is set to be large (about 7 kN), and the load thereafter in the latter half of the action is set to be small (about 5.5 kN). Thus, the load of the buckle-side FL mechanism is set to become smaller in the latter half of the action thereof than in an early stage of the action. As a result, in an early stage of a crash when the load exerted on the shoulder belt 20S starts to increase, the load of the buckle-side FL mechanism 54 becomes large (initial load: about 7 kN), so that the chest of the occupant is securely restrained in the early stage of the crash. Then, in the latter half of the crash when the load exerted by the shoulder belt 20S on the chest of the occupant becomes large as the occupant moves, the load of the buckle-side FL mechanism 54 decreases (to about 5.5 kN) to appropriately reduce the load exerted on the chest of the occupant.

Figure 3A:
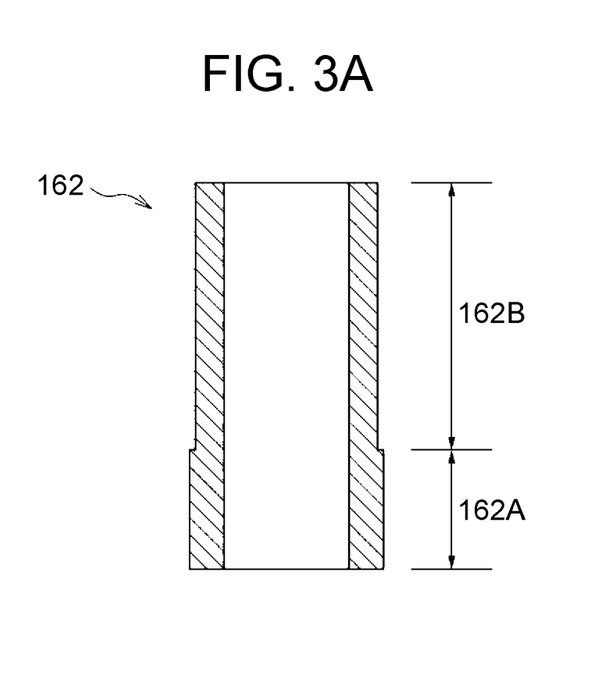
FIG. 3A is a sectional view showing a deformable tube of an inner belt according to Modified Example 1 of the first embodiment.
Figure 3B:
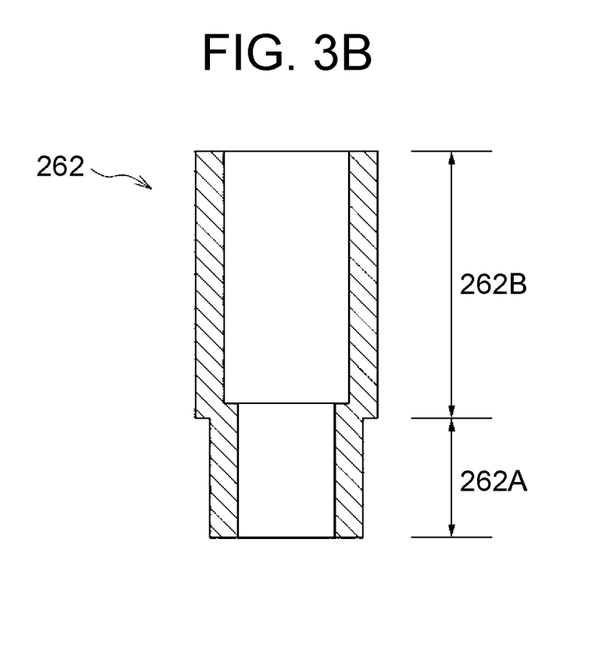
FIG. 3B is a sectional view showing a deformable tube of an inner belt according to Modified Example 2 of the first embodiment.
Figure 5B:
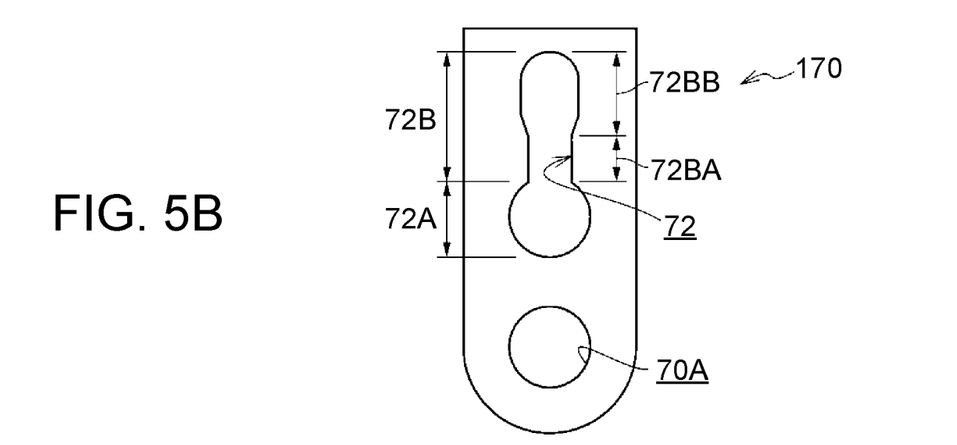
FIG. 5B is a view showing an anchor bracket according to Modified Example 3 of the second embodiment.
Figure 5C:
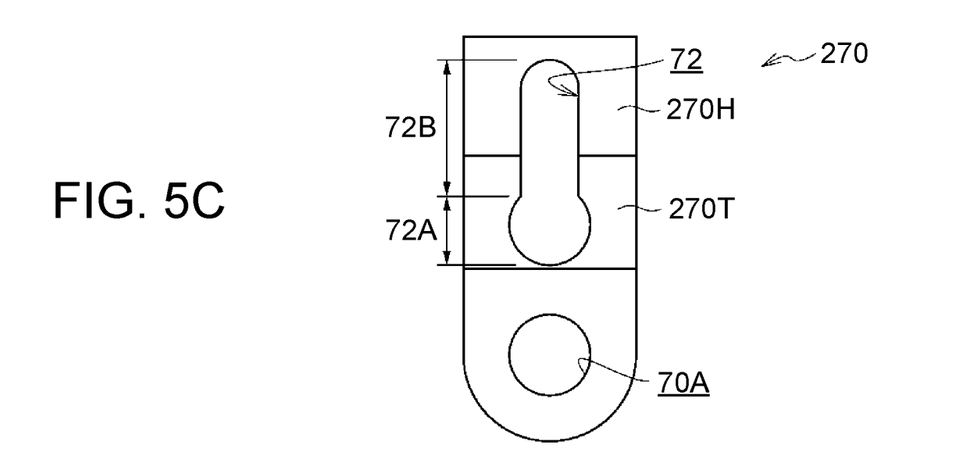
FIG. 5C is a view showing an anchor bracket according to Modified Example 4 of the second embodiment.

For example, the FL mechanism having such load characteristics can be realized by changing the structure of the deformable tube 62 of the FL mechanism 54 of the first embodiment to the structures shown in FIG. 3A and FIG. 3B, or by changing the structure of the anchor bracket 70 of the FL mechanism 154 of the second embodiment to the structures shown in FIG. 5B and FIG. 5C.

Modified Examples of First Embodiment

FIG. 3A shows a deformable tube 162 of an FL mechanism according to Modified Example 1 of the first embodiment. The plate thickness of the deformable tube 162 changes at the border between an inlet part 162A on the lower side and a general part 162B which is a part of the deformable tube 162 other than the inlet part 162A. Specifically, the deformable tube 162 has the inlet part 162A on the lower side with a large plate thickness (thick part) and the general part 162B with a comparatively small plate thickness (thin part). The internal shapes of the inlet part 162A and the general part 162B are the same. On the other hand, the external shape of the inlet part 162A is larger than the external shape of the general part 162B. The length of the inlet part 162A in an axial direction of the deformable tube 162 is smaller than the length of the general part 162B in the axial direction.

FIG. 3B shows a deformable tube 262 of an FL mechanism according to Modified Example 2 of the first embodiment. Unlike the deformable tube 162 of Modified Example 1, the deformable tube 262 of Modified Example 2 is formed so as to have a constant plate thickness along the entire length in an axial direction thereof. On the other hand, the cross-sectional shape of the deformable tube 262 of Modified Example 2 changes at the border between an inlet part 262A and a general part 262B. Thus, the inlet part 262A of the deformable tube 262 is formed so as to have a smaller cross-sectional shape (smaller inside diameter and outside diameter) than the general part 262B.

Also with either of the deformable tubes 162, 262 of Modified Example 1 and Modified Example 2, in an early stage of deformation when the squeeze member 66 (see FIG. 2A and FIG. 2B) deforms the inlet parts 162A, 262A of the deformable tubes 162, 262, a larger amount of energy is required for the deformation, while in the latter half of deformation when the general parts 162B, 262B of the deformable tubes 162, 262 are deformed, a smaller amount of energy is required for the deformation. Thus, the load characteristics shown in FIG. 7 can be realized.

Modified Examples of Second Embodiment

FIG. 5B shows an anchor bracket 170 of an FL mechanism according to Modified Example 3 of the second embodiment. In the anchor bracket 170 of Modified Example 3, the shape of the deformable part 72B of the long hole 72 is different from the shape of the deformable part 72B of the second embodiment. The deformable part 72B of the long hole 72 includes a narrow portion 72BA and a wide portion 72BB. The width dimensions of the narrow portion 72BA and the wide portion 72BB are both set to be smaller than the diameter of the intermediate portion of the squeeze pin 76 in the axial direction. The width dimension of the narrow portion 72BA is set to be smaller than that of the wide portion 72BB. The narrow portion 72BA is formed at a portion of the deformable part 72B adjacent to the fitting part 72A, and the wide portion 72BB is formed at a portion (general portion) of the deformable part 72B other than the narrow portion 72BA.

In Modified Example 3, the width dimension of the portion (narrow portion 72BA) of the deformable part 72B adjacent to the fitting part 72A, i.e., the portion that is deformed in an early stage of the action of the FL mechanism, is smaller than the width dimension of a general portion (wide portion 72BB) which is a portion of the deformable part 72B other than the portion adjacent to the fitting part 72A. Thus, in the early stage of the action of the FL mechanism, a larger load is required to deform the narrow portion 72BA. On the other hand, in the latter half of the action, the load required to deform the wide portion 72BB is smaller than the load required to deform the narrow portion 72BA. Thus, the load characteristics of the FL mechanism can be set such that the initial load is larger and the load in the latter half of the action is smaller.

FIG. 5C shows an anchor bracket 270 of an FL mechanism according to Modified Example 4 of the second embodiment. In the anchor bracket 270 of Modified Example 4, the shape of the long hole 72 is the same as the shape of the long hole 72 of the second embodiment (see FIG. 5A). On the other hand, the plate thickness of the anchor bracket 270 changes at a portion of a part where the long hole 72 is formed. Specifically, the anchor bracket 270 includes a main plate 270H having the same configuration as the anchor bracket 70 of the second embodiment, and an additional plate 270T that is laid on an intermediate portion of the main plate 270H in a longitudinal direction thereof. The long hole 72 is formed so as to extend through both the main plate 270H and the additional plate 270T. The portion of the long hole 72 at which the plate thickness is increased by the additional plate 270T corresponds to the fitting part 72A of the long hole 72 and a portion of the deformable part 72B (a portion thereof adjacent to the fitting part 72A).

In Modified Example 4, the plate thickness of the anchor bracket 270 at the portion of the deformable part 72B adjacent to the fitting part 72A, i.e., the portion that is deformed in an early stage of the action of the FL mechanism, is larger than the plate thickness of the anchor bracket 270 at a general portion (the portion of the deformable part 72B not corresponding to the additional plate 270T). Thus, the load characteristics of the FL mechanism can be set such that the initial load is larger and the load in the latter half of the action is smaller.

Supplementary Description of Above Embodiments

In the above embodiments, the example in which the three-point seatbelt device is applied to the driver's seat has been described, but the present disclosure is not limited to this example. The three-point seatbelt device of the present disclosure may also be applied to a front passenger's seat or a rear seat, or to a vehicle seat that is disposed at the center in the vehicle width direction.

In the above embodiments, the example in which the retractor 32 (shoulder-side reeler) is provided at the lower end of the B-pillar 16 has been described, but the present disclosure is not limited to this example. The shoulder-side reeler may instead be provided inside a vehicle seat.

In the above embodiments, the example has been described in which the end portion of the webbing 20 on the other side in the longitudinal direction (the side of the lap belt 20L) is engaged on the anchor member 36 fixed at the lower end of the B-pillar 16. However, the present disclosure is not limited to this example. For example, the end portion of the webbing 20 on the lap outer side may instead be fixed to the vehicle seat. Moreover, the end portion may be connected to a retractor (lap-side reeler) with a PT mechanism and be reeled up during a crash etc.

In the above embodiments, the example in which the tongue 40 is mounted so as to be movable in the longitudinal direction of the webbing 20 (continuous three-point seatbelt device) has been described, but the present disclosure is not limited to this example. The three-point seatbelt device of the present disclosure may instead be a separate three-point seatbelt device in which a lap belt and a shoulder belt are formed by separate webbings.

What is claimed is:

1. A three-point seatbelt device comprising:
   a webbing configured to function as a shoulder belt and a lap belt;
   a shoulder-side reeler that includes a pre-tensioner mechanism and a shoulder-side force limiter mechanism, and is configured to reel up an end portion of the webbing on a shoulder belt side so as to allow the webbing to be pulled out;
   a tongue mounted on the webbing; and
   an inner belt including a buckle to which the tongue is coupled, the inner belt including a buckle-side force limiter mechanism but not including any inner belt pre-tensioner mechanism,
   wherein an initial load of the buckle-side force limiter mechanism is set to be larger than an initial load of the shoulder-side force limiter mechanism.

2. The three-point seatbelt device according to claim 1, wherein
   the initial load of the buckle-side force limiter mechanism is set to be within a range of 1.3 to 2.2 times the initial load of the shoulder-side force limiter mechanism.

3. The three-point seatbelt device according to claim 1, wherein
   a load of the buckle-side force limiter mechanism is set to become smaller in a latter half of an action of the buckle-side force limiter mechanism than in an early stage of the action.

4. The three-point seatbelt device according to claim 1, wherein
   the buckle-side force limiter mechanism is disposed between the buckle and an anchorage position at which the inner belt is fixed to a vehicle body-side member.

5. The three-point seatbelt device according to claim 3, wherein
   the buckle-side force limiter mechanism includes:
     a case;
     a deformable tube disposed inside the case;
     a wire coupled to the buckle, and extending into the case and passing through the deformable tube; and
     a squeeze member coupled to the wire at a lower end of the wire,
   the buckle-side force limiter mechanism is configured such that, as the buckle is pulled by the tongue, the squeeze member moves upward while deforming the deformable tube and causes the buckle to be pulled out, and a lower part of the deformable tube has a larger plate thickness than a plate thickness of the remaining part of the deformable tube or has a smaller inside diameter than an inside diameter of the remaining part of the deformable tube.

6. The three-point seatbelt device according to claim 3, wherein
- the buckle-side force limiter mechanism includes
  - a deformable plate in which a long hole is formed,
  - a tubular member coupled to the buckle, and
  - a squeeze pin supported at both ends on the tubular member,
- the long hole includes a fitting part in which the squeeze pin is fitted and a deformable part having a smaller width than the fitting part,
- the buckle-side force limiter mechanism is configured such that, as the buckle is pulled by the tongue, the squeeze pin moves in a longitudinal direction of the long hole while deforming the deformable part and causes the buckle to be pulled out, and
- a width of a portion of the deformable part adjacent to the fitting part is smaller than a width of the remaining portion of the deformable part, or a plate thickness of the deformable plate at the portion of the deformable part adjacent to the fitting part is larger than a plate thickness of the deformable plate at the remaining portion of the deformable part.

7. The three-point seatbelt device according to claim 3, wherein
- the buckle-side force limiter mechanism includes
  - a deformable plate in which a long hole is formed,
  - a tubular member coupled to the buckle, and
  - a squeeze pin supported at both ends on the tubular member,
- the long hole includes a fitting part in which the squeeze pin is fitted and a deformable part having a smaller width than the fitting part,
- the buckle-side force limiter mechanism is configured such that, as the buckle is pulled by the tongue, the squeeze pin moves in a longitudinal direction of the long hole while deforming the deformable part and causes the buckle to be pulled out, and
- the deformable plate includes a main plate and an additional plate laid on a portion of the main plate such that a plate thickness of the deformable plate at a portion of the deformable part adjacent to the fitting part is larger than a plate thickness of the deformable plate at the remaining portion of the deformable part.

* * * * *